United States Patent
Altenberger et al.

(10) Patent No.: US 10,480,049 B2
(45) Date of Patent: Nov. 19, 2019

(54) COPPER ALLOY AND ITS USES

(71) Applicant: WIELAND-WERKE AG, Ulm (DE)

(72) Inventors: Igor Altenberger, Neu-Ulm (DE); Hans-Achim Kuhn, Illertissen (DE)

(73) Assignee: WIELAND-WERKE AG, Ulm (DE)

( * ) Notice: Subject to any disclaimer, the term of this patent is extended or adjusted under 35 U.S.C. 154(b) by 188 days.

(21) Appl. No.: 15/475,781

(22) Filed: Mar. 31, 2017

(65) Prior Publication Data

US 2017/0349974 A1   Dec. 7, 2017

(30) Foreign Application Priority Data

Jun. 3, 2016 (DE) .................. 10 2016 006 824

(51) Int. Cl.
*C22C 9/01* (2006.01)
*C22C 9/06* (2006.01)

(52) U.S. Cl.
CPC ..................... *C22C 9/06* (2013.01)

(58) Field of Classification Search
CPC .... C22C 9/06; C22C 9/01; C22C 9/00; C22C 1/0425; C22F 1/08; F16C 2204/10
USPC .......................................... 148/432; 428/674
See application file for complete search history.

(56) References Cited

U.S. PATENT DOCUMENTS

| | | |
|---|---|---|
| 3,793,009 A | 2/1974 | Katsitadze et al. |
| 3,901,692 A | 8/1975 | Mikawa |
| 6,699,337 B2 | 3/2004 | Hatakeyama et al. |
| 6,933,054 B2 | 8/2005 | Ohla et al. |
| 2005/0079378 A1* | 4/2005 | Lundberg ............ B32B 15/01 428/674 |
| 2011/0059335 A1 | 3/2011 | Hernblom et al. |
| 2013/0333812 A1 | 12/2013 | Ishida et al. |
| 2017/0051385 A1 | 2/2017 | Gummert et al. |

FOREIGN PATENT DOCUMENTS

| | | |
|---|---|---|
| DE | 1 558 773 A1 | 7/1970 |
| DE | 101 59 949 C1 | 5/2003 |
| EP | 2 927 335 A1 | 10/2015 |

OTHER PUBLICATIONS

German Office Action for corresponding application No. 10 2016 006 824.8, with partial English translation, dated May 19, 2017 (9 pages).

* cited by examiner

*Primary Examiner* — Matthew E. Hoban
*Assistant Examiner* — Lynne Edmondson
(74) *Attorney, Agent, or Firm* — Flynn Thiel, P.C.

(57) ABSTRACT

A copper alloy having the following composition (in % by weight):
from 10.6 to 18% of Al,
from 10.5 to 14.5% of Ni,
optionally up to 2% of Fe,
optionally up to 1% of Co,
optionally up to 0.5% of Ti,
optionally up to 0.5% of Mn,
optionally up to 0.15% of B,
optionally up to 0.1% of Ca, and
optionally up to 0.1% of C, with
the balance being copper and unavoidable impurities. Nickel aluminides of the NiAl type are embedded as precipitates in the microstructure of the alloy.

10 Claims, No Drawings

COPPER ALLOY AND ITS USES

CROSS-REFERENCE TO RELATED APPLICATIONS

This claims priority from German Patent Application No. 10 2016 006 824.8, filed Jun. 3, 2016, the disclosure of which is hereby incorporated by reference in its entirety into this application.

FIELD OF THE INVENTION

The invention relates to an aluminum- and nickel-containing copper alloy and its use for sliding elements, plug connectors, sealing elements, tools, spring elements or filter elements.

The properties of copper alloys can be set in a targeted way by alloying-in of particular elements. A high strength of the alloy is usually associated with a significantly reduced electrical conductivity. For this reason, copper alloys which are characterized by a high strength combined with an acceptable electrical conductivity are of interest.

BACKGROUND OF THE INVENTION

The document DE 1 558 773 discloses copper alloys comprising from 10 of 12% by weight of aluminum and from 2 to 10% by weight of nickel, optionally also from 1 to 6% by weight of iron, and also a process for the heat treatment of such alloys. The heat treatment takes place in a temperature range from 427 to 566° C. Strengths of a maximum of 940 MPa were determined on specimens containing from 4 to 5% by weight of nickel and from 4 to 5% by weight of iron. DE 1 558 773 does not give any information on the electrical conductivity of these alloys.

Furthermore, corrosion-resistant copper alloys comprising from 0.1 to 11% by weight of aluminum, from 0.1 to 10% by weight of nickel, from 0.01 to 6% by weight of iron, from 0.001 to 1.0% by weight of boron and from 0.01 to 10% by weight of manganese are known from the document U.S. Pat. No. 3,901,692. Preference is given to the proportion of aluminum being from 6 to 7% by weight, the proportion of nickel being from 5 to 7% by weight, the proportion of iron being from 3 to 4% by weight and the proportion of manganese being from 5 to 10% by weight. From 0.01 to 5% by weight of cobalt can optionally be added to the alloy. An electrical conductivity in the range from 15 to 20% IACS is reported for an alloy comprising 6.5% by weight of Ni, 6% by weight of Al, 3% by weight of Co, 3% by weight of Fe and 0.2% by weight of Mn. No information in respect of the electrical conductivity is documented for cobalt-free alloys.

SUMMARY OF THE INVENTION

It is an object of the invention to provide a Be- and Sn-free copper alloy which in the cast state has a tensile strength of at least 700 MPa and in the hot-formed state without cold forming has a tensile strength of at least 800 MPa at an electrical conductivity of at least 13% IACS. Furthermore, the alloy should have a sufficient ductility, be hot aging resistant up to 500° C. and be able to be subjected to cutting machining by customary methods. In addition, it is an object of the invention to indicate uses for which this copper alloy is suitable.

The invention is defined in respect of a copper alloy and in respect of uses and further advantageous embodiments and further developments of the invention.

The invention provides a copper alloy having the following composition in % by weight:
from 10.6 to 18% of Al,
from 10.5 to 14.5% of Ni,
optionally up to 2% of Fe,
optionally up to 1% of Co,
optionally up to 0.5% of Ti,
optionally up to 0.5% of Mn,
optionally up to 0.15% of B,
optionally up to 0.1% of Ca,
optionally up to 0.1% of C,
a balance copper and unavoidable impurities, wherein nickel aluminides of the NiAl type are embedded as precipitates in the microstructure of the alloy.

The invention proceeds from the idea that a highly heat resistant, lightweight copper alloy having high strength, acceptable ductility and at the same time good electrical conductivity can be produced by alloying-in of aluminum and nickel. In the case of copper alloys having a proportion of Al of from 10.6 to 18% by weight and a proportion of Ni of from 10.5 to 14.5%, the tensile strength in the cast state is at least 700 MPa. The tensile strength can be increased to at least 800 MPa by hot forming in the temperature range from 610 to 690° C. with a degree of deformation of at least 20%. Here, the degree of deformation is defined as the relative reduction of the cross-sectional area. The hardness of such a material is at least 280 HV. In the case of the copper alloy of the invention, a high strength can thus be achieved without cold forming. It can thus also be produced in large dimensions in the high-strength state. The electrical conductivity is approximately 12% IACS in the cast state and in the case of the wrought alloy, i.e. after hot forming, is at least 13% IACS. The strength of the copper alloy of the invention can be increased further when the alloy is, after the above-described hot forming, aged at temperatures in the range from 300 to 600° C. The aging preferably takes place in the temperature range from 300 to 400° C. for an aging time of at least 30 minutes and not more than 7 hours. The density of the copper alloy of the invention is, depending on the precise composition, in the range from 6500 to 7000 kg/m$^3$. The alloy is very aging-resistant and can be subjected to conventional cutting machining using a customary tool.

At a proportion of Al of less than 10.6% by weight, the tensile strength in the hot-formed state is less than 800 MPa, in the cast state significantly below 700 MPa. The proportion of Al is preferably at least 11% by weight. At a proportion of Al of more than 18% by weight, the electrical conductivity is less than 13% IACS.

At a proportion of Ni of less than 10.5% by weight, the tensile strength in the hot-formed state is significantly below 800 MPa, in the cast state significantly below 700 MPa. The proportion of Ni is preferably at least 11% by weight. Due to the high proportion of Ni, the alloy has excellent corrosion resistance in air and also in sea water. As the proportion of Ni increases, the alloy becomes more brittle and also more expensive. For this reason, the proportion of Ni should not exceed 14.5% by weight.

In the copper alloy of the invention, a particularly high proportion by volume of nickel aluminides are formed and are embedded as precipitates in the microstructure which otherwise consists of copper mixed crystal and hard $\gamma_2$ phase ($Al_4Cu_9$). The proportion by volume of these nickel aluminides can be 50% by volume or more. The precipitates are formed as highly heat-resistant, ordered phases having the stoichiometric composition NiAl. A particularly high hot strength is achieved as a result of the high proportion of precipitates since dislocations have to go around the precipitates. The high proportion of precipitates also results in a high wear resistance and strength at room temperature.

If required, a microstructure having a small grain size can be set in the copper alloy of the invention by adding at least one of the following elements:
optionally up to 2% by weight of Fe,
optionally up to 1% by weight of Co,
optionally up to 0.5% by weight of Ti,
optionally up to 0.5% by weight of Mn,
optionally up to 0.15% by weight of B,
optionally up to 0.1% by weight of Ca,
optionally up to 0.1% by weight of C.

The addition of one or more of these elements inhibits the formation of coarse grains in the cast state. The effect of grain refining occurs to a significant extent only above a particular lower limit, with this lower limit being able to be different for each element. As long as one of the elements mentioned is present in a proportion below this threshold in the alloy, it can be counted among the impurities. However, it is in principle also possible for the copper-aluminum-nickel alloy of the invention not to comprise any of the abovementioned elements.

In the copper alloy of the invention, the sum of the proportion of aluminum and the proportion of nickel can preferably be at least 22.1% by weight, particularly preferably at least 24% by weight. Above these limits, sufficiently many nickel aluminides are formed, so that the properties of the alloy are well pronounced.

In the copper alloy of the invention, the sum of the proportion of aluminum and the proportion of nickel can preferably be not more than 29% by weight, particularly preferably not more than 27% by weight. Below these limits, undesirable secondary effects of the alloying elements, for example embrittlement, occur to only a minor extent.

In a preferred embodiment of the invention, the proportion of aluminum in the copper alloy of the invention can be at least 12% by weight and not more than 16% by weight. At a proportion of aluminum in this range, a particularly favorable balance of strength, wear resistance and electrical conductivity can be achieved.

The proportion of nickel in the copper alloy of the invention can advantageously be at least 11% by weight and not more than 13% by weight. At a proportion of nickel in this range, a particularly favorable balance of strength, ductility and electrical conductivity can be achieved.

In a particularly advantageous embodiment of the copper alloy of the invention, the proportion of aluminum can be at least 12% by weight, particularly preferably at least 13% by weight, and not more than 16% by weight and the proportion of nickel can be at least 11% by weight and not more than 13% by weight. In the case of a wrought copper alloy having this composition, a tensile strength of above 1000 MPa at an electrical conductivity of at least 15% IACS can be achieved without cold forming. Alloys having this composition additionally have a particularly good hot strength. A noticeable decrease in the tensile strength is observed only after a heat treatment at 600° C. for 6 hours. Here, a noticeable decrease is a decrease of more than 10%.

Furthermore, it can be advantageous in the case of the copper alloy of the invention for the ratio of the proportion of aluminum (in % by weight) to the proportion of nickel (in % by weight) to be at least 0.95 and not more than 1.28. If the proportion of aluminum and the proportion of nickel have this relationship, particularly advantageous conditions for the formation of the advantageous nickel aluminides are ensured. Aluminum present in a stoichiometric excess is either built into the matrix of the alloy or forms the wear-resistant but brittle $Al_4Cu_9$ phase.

Particularly advantageous alloys can contain a proportion of aluminum of at least 13.5% by weight and a proportion of nickel of at least 11.5% by weight. Materials having excellent properties are obtained from such alloys by extrusion. The extrusion ratio, defined as the ratio of cross-sectional area of the material before extrusion to cross-sectional area of the material after extrusion, is preferably at least 11.5 and the extrusion temperature is in the range from 660 to 690° C. In the case of such materials, a tensile strength of 1150 MPa and a fatigue resistance of 500 MPa are achieved. The materials display a high heat resistance. They can be used at temperatures of up to 500° C., briefly even up to 650° C. The cause of the better mechanical properties after this process is a particularly finely dispersed NiAl phase.

A further aspect of the invention provides for the use of the copper alloy of the invention for sliding bearings. Owing to the high proportion by volume of NiAl precipitates, the copper alloy of the invention has a high hot strength and a high wear resistance. These properties are advantageous for sliding bearings. Sliding bearings made of the copper alloy of the invention can also be operated under overload, with dry running or at temperatures above 200° C. without damage occurring.

A further aspect of the invention provides for the use of the copper alloy of the invention for plug connectors. For use in plug connectors, a material has to have a particular combination of strength, electrical conductivity and resistance to stress relaxation. The strength of the copper alloy of the invention is at a very high level for copper materials. The electrical conductivity of the copper alloy of the invention is, with a minimum value of 13% IACS, at a level which is satisfactory for plug connectors. The hot strength and the high destrengthening temperature of the copper alloy of the invention result in good resistance to stress relaxation.

A further aspect of the invention provides for the use of the copper alloy of the invention for sealing elements. Examples are cylinder head gaskets and contact rings. Sealing elements have to be wear-resistant and also resistant to oxidation and creep at high temperatures. The copper alloy of the invention satisfies these conditions in an excellent way because of its composition and its properties.

A further aspect of the invention provides for the use of the copper alloy of the invention for tools. Tools have to have a high hardness and a high wear resistance even at elevated temperatures. The copper alloy of the invention is therefore particularly well-suited as material for tools. A further possible use for the copper alloy of the invention is as boring rods.

A further aspect of the invention provides for the use of the copper alloy of the invention for spring elements. Springs have to have a high resilience and be relaxation-resistant. Resilience is the ability of a material to return to the initial state after a large elastic deformation. A material having a high resilience is able to store a large quantity of energy in elastic form and release it again. The copper alloy of the invention has a high yield point under tensile load or a high compression limit under compressive stress. Plastic deformation does not occur up to these limits. A spring element made of the copper alloy of the invention can consequently elastically store a large quantity of energy. The low density of from 6500 to 7000 $kg/m^3$ makes the construction of relatively light spring elements possible.

A further aspect of the invention provides for the use of the copper alloy of the invention for filter elements, in particular antimicrobial filter elements. Antimicrobial filters have to be able to ensure passage of liquid or air while at the same time mechanically blocking bacteria and most viruses. For this purpose, channels having a passage width of from 20 to 50 nm are necessary. A structure having such channels can be produced by subjecting the copper alloy of the invention in the cast state to an etching treatment. As a result of the etching treatment, the copper mixed crystal is removed from the microstructure and the NiAl precipitates remain in lamellar form. Channels having a passage width of from about 20 to 50 nm are formed between adjacent lamellae by the removal of the copper mixed crystal. Such a structure represents an effective mechanical barrier against all types of bacteria and about 80% of all known viruses.

The invention will be illustrated with the aid of working examples. Table 1 shows a compilation of alloy samples No. 1 to 8. The alloy composition in % by weight, the hardness, the electrical conductivity and the tensile strength are reported for each sample. With the exception of sample No. 6, which is present only in the cast state, the samples are present in the state immediately after hot forming in the temperature range from 600 to 800° C. at a degree of deformation of 20%. Samples No. 1 to 6 are comparative samples, and samples No. 7 and 8 have a composition according to the invention.

TABLE 1

Alloy samples No. 1 to 8

| Sample No. | Al in % by weight | Ni in % by weight | Cu and impurities | Hardness | Electrical conductivity in IACS | Tensile strength $R_m$ in MPa |
|---|---|---|---|---|---|---|
| 1 | 5.7 | 6.9 | Balance | 201 HV | 11.7% | 401 |
| 2 | 6.5 | 7.9 | Balance | 234 HV | 13.3% | 422 |
| 3 | 7.6 | 8.9 | Balance | 248 HV | 13.4% | 661 |
| 4 | 8.6 | 9.8 | Balance | 246 HV | 13.5% | 717 |
| 5 | 10.7 | 10.1 | Balance | 271 HV | 12.7% | 820 |
| 6 | 9.2 | 17.9 | Balance | 250 EV | 8.0% | — |
| 7 | 11.1 | 11.2 | Balance | 280 HV | 14.1% | 830 |
| 8 | 13.9 | 12.1 | Balance | 300 HV | 14.8% | 1000 |

Samples No. 1 to 4 have a comparatively low proportion of aluminum and/or nickel. The tensile strength of these samples increases with an increasing proportion of aluminum and nickel and is significantly below 750 MPa. The electrical conductivity of samples No. 2 to 4 is at the same level. Sample No. 5 has an increased tensile strength and hardness compared to samples 2 to 4, but its electrical conductivity is reduced. In the case of sample No. 6, the proportion of nickel was made very high at 17.9% by weight. The hardness is approximately the same as the value for samples No. 3 and 4, but the electrical conductivity is at a lower level, namely 8% IACS.

Samples No. 7 and 8 according to the invention display unexpectedly good properties. If sample No. 7 is compared with No. 5, it is found that the strength has been increased further by increasing the proportions of aluminum and in particular of nickel, but the electrical conductivity has surprisingly also increased. The increase in the electrical conductivity in the case of sample No. 7 is not to be expected from the properties of samples No. 1 to 6. The best results were achieved in the case of sample No. 8. At about 14% by weight of aluminum and 12% by weight of nickel, a tensile strength of about 1000 MPa could be achieved in the hot-rolled state. The electrical conductivity is almost 15% IACS and is the highest value for all samples examined. The electrical conductivity of sample No. 8 could be increased further to almost 16% IACS by a heat treatment at 330° C. for 3 hours.

Sample No. 8 has a total of 26% by weight of alloying elements Al and Ni. Sample No. 6 has a total of about 27% by weight of alloying elements Al and Ni. The two samples thus have in total about the same proportion by weight of alloying elements. However, the properties of sample No. 8 are significantly better than those of sample No. 6. This shows that the alloying elements Al and Ni have to be selected in a particular relationship to one another. In the case of sample No. 8 the ratio of the proportions by weight of Al and Ni is about 1.15. Alloys having favorable properties are obtained when the ratio of Al to Ni is at least 0.95 and not more than 1.28.

The invention claimed is:

1. A copper alloy consisting of the following composition in % by weight:
   from 10.6 to 18% of Al,
   from 10.5 to 14.5% of Ni,
   optionally up to 2% of Fe,
   optionally up to 1% of Co,
   optionally up to 0.5% of Ti,
   optionally up to 0.5% of Mn,
   optionally up to 0.15% of B,
   optionally up to 0.1% of Ca, and
   optionally up to 0.1% of C, with
   the balance being copper,
   characterized in that nickel aluminides of the NiAl type are embedded as precipitates in the microstructure of the alloy.

2. The copper alloy according to claim 1, characterized in that the proportion of aluminum is at least 12% by weight and not more than 16% by weight.

3. The copper alloy according to claim 1, characterized in that the proportion of nickel is at least 11% by weight and not more than 13% by weight.

4. The copper alloy according to claim 1, characterized in that the ratio of the proportion of aluminum in % by weight to proportion of nickel in % by weight is at least 0.95 and not more than 1.28.

5. A sliding element comprising a copper alloy according to claim 1.

6. A plug connector comprising a copper alloy according to claim 1.

7. A sealing element comprising a copper alloy according to claim 1.

8. A tool comprising a copper alloy according to claim 1.

9. A spring element comprising a copper alloy according to claim 1.

10. A filter element comprising a copper alloy according to claim 1.

* * * * *